United States Patent
Zhang et al.

(10) Patent No.: US 9,551,282 B2
(45) Date of Patent: Jan. 24, 2017

(54) MEDIA PADS WITH MIST ELIMINATION FEATURES

(71) Applicant: General Electric Company, Schenectady, NY (US)

(72) Inventors: Jianmin Zhang, Greer, SC (US); Bradly Aaron Kippel, Greer, SC (US)

(73) Assignee: General Electric Company, Schenectady, NY (US)

( * ) Notice: Subject to any disclaimer, the term of this patent is extended or adjusted under 35 U.S.C. 154(b) by 230 days.

(21) Appl. No.: 14/516,663

(22) Filed: Oct. 17, 2014

(65) Prior Publication Data
US 2016/0108816 A1    Apr. 21, 2016

(51) Int. Cl.
| | | |
|---|---|---|
| *B01D 45/00* | (2006.01) | |
| *F02C 7/18* | (2006.01) | |
| *B01D 45/08* | (2006.01) | |
| *C04B 41/00* | (2006.01) | |
| *C04B 38/00* | (2006.01) | |
| *C04B 35/565* | (2006.01) | |
| *F01M 13/04* | (2006.01) | |
| *F02C 7/057* | (2006.01) | |

(52) U.S. Cl.
CPC .............. *F02C 7/185* (2013.01); *B01D 45/08* (2013.01); *C04B 35/565* (2013.01); *C04B 38/0006* (2013.01); *C04B 41/009* (2013.01); *F01M 13/04* (2013.01); *F02C 7/057* (2013.01)

(58) Field of Classification Search
CPC .......... F02C 7/185; F02C 7/057; B01D 45/08; C04B 41/009; C04B 38/0006; C04B 35/565; F01M 13/04
See application file for complete search history.

(56) References Cited

U.S. PATENT DOCUMENTS

| | | | | |
|---|---|---|---|---|
| 2,818,946 A | * | 1/1958 | Noel | B60J 5/0488 49/501 |
| 3,616,623 A | * | 11/1971 | Reid | B01D 45/08 55/440 |
| 4,427,607 A | | 1/1984 | Korsell | |
| 4,443,233 A | * | 4/1984 | Moran | B01D 45/08 55/315 |
| 4,556,521 A | | 12/1985 | Baigas, Jr. | |
| 4,728,468 A | * | 3/1988 | Duke | B01J 19/32 261/111 |
| 5,143,658 A | | 9/1992 | Thomas | |
| 5,217,788 A | * | 6/1993 | Rye | B01J 19/32 261/112.2 |
| 5,776,380 A | | 7/1998 | Baigas, Jr. | |

(Continued)

FOREIGN PATENT DOCUMENTS

WO    2006/066304 A1    6/2006

OTHER PUBLICATIONS

U.S. Appl. No. 14/318,891, filed Jun. 30, 2014, Zhang, et al., Application no yet published.

*Primary Examiner* — Dung H Bui
(74) *Attorney, Agent, or Firm* — Sutherland Asbill & Brennan LLP

(57) ABSTRACT

The present application provides a media pad for cooling an inlet air flow to a compressor of a gas turbine engine. The media pad may include a first media sheet with a chevron corrugated surface having a first mist eliminator and a second media sheet with a wavy corrugated surface having a second mist eliminator.

16 Claims, 4 Drawing Sheets

(56) References Cited

U.S. PATENT DOCUMENTS

| | | | | |
|---|---|---|---|---|
| 6,059,934 | A * | 5/2000 | Stober | B01D 1/30 202/158 |
| 6,083,302 | A * | 7/2000 | Bauver, II | B01D 45/08 55/440 |
| 6,353,080 | B1 | 3/2002 | Gan et al. | |
| 6,409,157 | B1 | 6/2002 | Lundin et al. | |
| 6,458,451 | B1 | 10/2002 | Steidl et al. | |
| 7,674,304 | B2 * | 3/2010 | Krell | B01D 1/305 261/112.2 |
| 7,850,929 | B2 * | 12/2010 | Smith, Jr. | B01D 3/009 210/767 |
| 8,365,530 | B2 | 2/2013 | Zhang et al. | |
| 2003/0220048 | A1 | 11/2003 | Toro et al. | |
| 2005/0046050 | A1 * | 3/2005 | Palmer | F24F 5/0035 261/97 |
| 2005/0120688 | A1 * | 6/2005 | Shepherd | B01D 45/06 55/440 |
| 2006/0240730 | A1 | 10/2006 | DeMott et al. | |
| 2006/0292349 | A1 * | 12/2006 | Seeley | F24F 5/0035 428/185 |
| 2007/0224903 | A1 | 9/2007 | Chakravarty et al. | |
| 2009/0071337 | A1 * | 3/2009 | Nieuwoudt | B01D 45/06 95/272 |
| 2009/0294548 | A1 * | 12/2009 | Geiger | B32B 5/26 239/6 |
| 2010/0050873 | A1 | 3/2010 | Hiner et al. | |
| 2010/0054919 | A1 | 3/2010 | Hiner et al. | |
| 2010/0206170 | A1 * | 8/2010 | Geisner | B01D 45/08 96/190 |
| 2010/0263541 | A1 | 10/2010 | Kippel et al. | |
| 2010/0307164 | A1 | 12/2010 | Zhang et al. | |
| 2010/0319384 | A1 | 12/2010 | Zhang et al. | |
| 2011/0042836 | A1 | 2/2011 | Zhang et al. | |
| 2011/0099970 | A1 | 5/2011 | Zhang et al. | |
| 2011/0173947 | A1 | 7/2011 | Zhang et al. | |
| 2012/0031596 | A1 * | 2/2012 | Kippel | F28D 5/00 165/168 |
| 2012/0073215 | A1 | 3/2012 | Zhang et al. | |
| 2012/0087783 | A1 | 4/2012 | Zhang | |
| 2013/0011244 | A1 | 1/2013 | Hao et al. | |
| 2013/0011249 | A1 | 1/2013 | Kippel et al. | |
| 2013/0047562 | A1 * | 2/2013 | Paris | B01D 53/26 55/308 |
| 2013/0047641 | A1 * | 2/2013 | Townsend | F25B 39/04 62/92 |
| 2013/0067922 | A1 | 3/2013 | Zhang et al. | |
| 2013/0087219 | A1 | 4/2013 | Rajesh et al. | |
| 2013/0091864 | A1 | 4/2013 | Auzelyte et al. | |
| 2013/0199150 | A1 | 8/2013 | Zhang et al. | |
| 2013/0199192 | A1 | 8/2013 | Zhang et al. | |
| 2013/0199196 | A1 | 8/2013 | Chillar et al. | |
| 2013/0199202 | A1 | 8/2013 | Zhang et al. | |
| 2013/0255208 | A1 | 10/2013 | Zhang et al. | |
| 2014/0069076 | A1 | 3/2014 | Ponyavin et al. | |
| 2014/0123674 | A1 | 5/2014 | Hao et al. | |
| 2014/0360708 | A1 * | 12/2014 | Padovan | B01D 45/08 165/170 |
| 2015/0377569 | A1 * | 12/2015 | Zhang | F02C 7/04 165/185 |

\* cited by examiner

MEDIA PADS WITH MIST ELIMINATION FEATURES

TECHNICAL FIELD

The present application and the resultant patent relate generally to gas turbine engines and more particularly relate to an evaporative cooling media pad surface design with integral mist elimination features for improved water flow distribution and evaporation for power augmentation.

BACKGROUND OF THE INVENTION

A conventional gas turbine engine includes a compressor for compressing a flow of ambient air, a combustor for mixing the compressed flow of ambient air with a flow of fuel and combusting the mixture, and a turbine that is driven by the combustion mixture to produce power and exhaust gases. Various strategies are known for increasing the amount of power that a gas turbine engine may be able to produce. One method of increasing the power output is by cooling the ambient air flow upstream of the compressor. Such cooling may cause the air to have a higher density, thereby creating a higher mass flow rate into the compressor. The higher mass flow rate into the compressor allows more air to be compressed so as to allow the gas turbine engine to produce more power. Moreover, cooling the ambient air flow generally may increase the overall efficiency of the gas turbine engine in hot environments.

Various systems and methods may be utilized to cool the ambient air flow entering the gas turbine engine. For example, heat exchangers may be used to cool the ambient air flow through latent cooling or through sensible cooling. Such heat exchangers often may utilize a media pad to facilitate the cooling of the ambient air flow. These media pads may allow heat and/or mass transfer between the ambient air flow and a coolant flow such as a flow of water. The ambient air flow interacts with the coolant flow in the media pad for heat exchange therewith.

The airflow passages through such media pads are intended to provide effective water evaporation and mixing of the flow of ambient air with the water vapor from the flow of water. As the air velocity increases, however, water shedding may occur. Specifically, airborne water droplets may accumulate in a downstream inlet duct and/or flow into the compressor. Such water droplets may cause blade abrasion and the like. Known inlet air system thus may incorporate an evaporative cooling system with a downstream mist eliminator. Such mist eliminators, however, require both significant space and additional materials. Moreover, such mist eliminators generally require routine maintenance and associated down time. Known systems also add pressure losses which reduce overall gas turbine output.

There is therefore a desire for an improved media pad that provides efficient cooling without requiring a further downstream mist eliminator. Such a media pad may provide cooling efficiency with less space requirements and fewer materials as compared to known systems. Moreover, such a media may provide a lower system pressure drop as compared to known systems.

SUMMARY OF THE INVENTION

The present application and the resultant patent thus provide a media pad for cooling an inlet air flow to a compressor of a gas turbine engine. The media pad may include a first media sheet with a chevron corrugated surface having a first mist eliminator and a second media sheet with a wavy corrugated surface having a second mist eliminator.

The present application and the resultant patent further provide a method of cooling an inlet air flow for a gas turbine engine. The method may include the steps of positioning a media pad with a first corrugated surface, a second corrugated surface, and an integral mist eliminator about an inlet of the gas turbine engine, flowing water from a top to a bottom of the media pad through the first corrugated surface and the second corrugated surface, exchanging heat between the inlet air flow and the flow of water, capturing any mist from the flow of water in the integral mist eliminator, and flowing the captured mist back to the first corrugated surface and the second corrugated surface.

The present application and the resultant patent further provide a media pad for cooling an inlet air flow to a compressor of a gas turbine engine. The media pad may include a first media sheet with a number of chevron channels leading to first mist eliminator and a second media sheet leading to a number of wavy channels leading to a second mist eliminator. The first mist eliminator and the second mist eliminator may combine to form an integral mist eliminator so as to capture and return any water mist therein.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
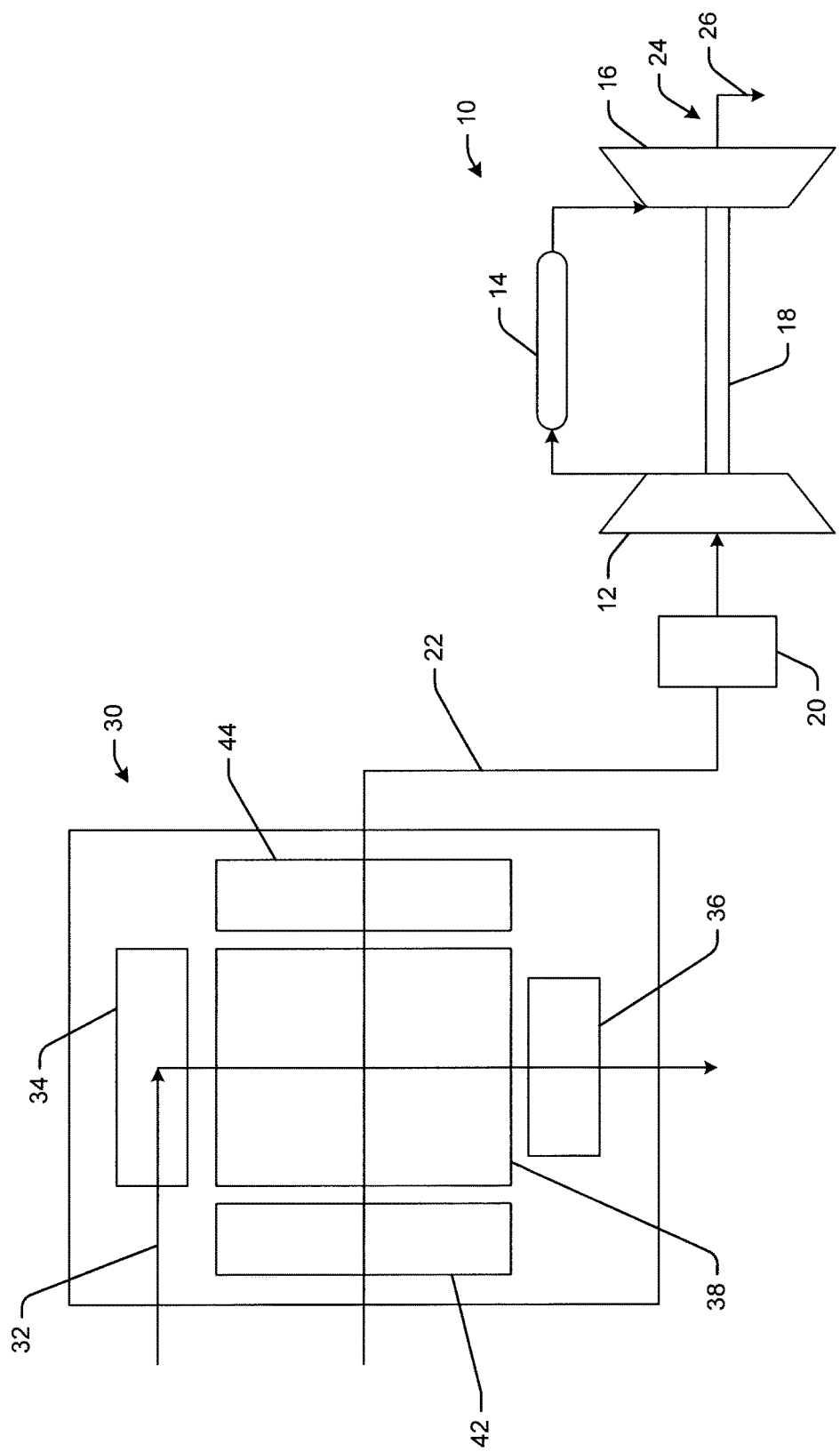
FIG. 1 is a schematic diagram of a gas turbine engine with an inlet air cooling system.

Referring now to the drawings, in which like numerals refer to like elements throughout the several views, FIG. 1 is a schematic diagram of an example of a gas turbine engine 10. The gas turbine engine 10 may include a compressor 12, a combustor 14, and a turbine 16. Although only a single combustor 14 is shown, any number of the combustors 14 may be used herein and positioned within a circumferential array and the like. The compressor 12 and the turbine 16 may be coupled by a shaft 18. The shaft 18 may be a single shaft or a number of shaft segments coupled together. The shaft 18 also may drive a load such as a generator and the like.

The gas turbine engine 10 further may include a gas turbine air inlet 20. The air inlet 20 may be configured to accept an inlet air flow 22. For example, the air inlet 20 may be in the form of a gas turbine inlet house and the like. Alternatively, the air inlet 20 may be any portion of the gas turbine engine 10, such as any portion of the compressor 12 or any apparatus upstream of the compressor 12 which may accept the inlet air flow 22. The inlet air flow 22 may be ambient air and may be conditioned or unconditioned.

The gas turbine engine 10 further may include an exhaust outlet 24. The exhaust outlet 24 may be configured to discharge a gas turbine exhaust flow 26. The exhaust flow 26 may be directed to a heat recovery steam generator (not shown). Alternatively, the exhaust flow 26 may be, for example, directed to an absorption chiller (not shown) to chill a flow of water 32, directed to a heat recovery steam generator (not shown), directed to a desalination plant, or dispersed into the ambient air in whole or in part.

The gas turbine engine 10 further may include one or more heat exchangers 30. The heat exchanger 30 may be configured to cool the inlet air flow 22 before entry into the compressor 12. For example, the heat exchanger 30 may be disposed about the gas turbine air inlet 20. Alternatively, the heat exchanger 30 may be upstream or downstream of the gas turbine inlet 20. The heat exchanger 30 may allow the inlet air flow 22 and a heat exchange medium such as a flow of water 32 to exchange heat therein. The heat exchange medium also may be any suitable type of fluid flow. The heat exchanger 30 thus may facilitate the interaction of the inlet air flow 22 and the flow of water 32 therein so as to cool the inlet air flow 22 before entering the compressor 12.

The heat exchanger 30 may be a direct contact type heat exchanger 30. The heat exchanger 30 may include a heat exchange medium inlet 34, a heat exchange medium outlet 36, and a media pad 38 therebetween. The flow of water 32 or other type of heat exchange medium may flow through the heat exchange medium inlet 34 to the media pad 38. The heat exchange medium inlet 34 may include a nozzle, a number of nozzles, a manifold with an orifice or a number of orifices, and the like. The heat exchange medium outlet 36 may accept the flow of water 32 exhausted from the media pad 38. The heat exchange medium outlet 36 may be a sump disposed downstream of the media pad 38 in the direction of the flow of water 32. The flow of water 32 may be directed in a generally or approximately downward direction from the heat exchange medium inlet 34 through the media pad 38 while the inlet air flow 22 may be directed through the heat exchanger 30 in a direction generally or approximately perpendicular to the direction of the flow of water 32. Other types of counter or cross flow arrangements also may be used.

A filter 42 may be disposed upstream of the media pad 38 in the direction of inlet air flow 22. The filter 42 may be configured to remove particulates from the inlet air flow 22 so as to prevent the particulates from entering into the gas turbine engine 10. Alternatively, the filter 42 may be disposed downstream of the media pad 38 in the direction of inlet air flow 22. A drift eliminator 44 may be disposed downstream of the media pad 38 in the direction of inlet air flow 22. The drift eliminator 44 may act to remove droplets of the flow of water 32 from the inlet air flow 22 before the inlet air flow 22 enters the compressor 12.

The heat exchanger 30 may be configured to cool the inlet air flow 22 through latent or evaporative cooling. Latent cooling refers to a method of cooling where heat is removed from a gas, such as air, so as to change the moisture content of the gas. Latent cooling may involve the evaporation of a liquid at approximate ambient wet bulb temperature to cool the gas. Specifically, latent cooling may be utilized to cool a gas to near its wet bulb temperature.

Alternatively, the heat exchanger 30 may be configured to chill the inlet air flow 22 through sensible cooling. Sensible cooling refers to a method of cooling where heat is removed from a gas, such as air, so as to change the dry bulb and wet bulb temperatures of the air. Sensible cooling may involve chilling a liquid and then using the chilled liquid to cool the gas. Specifically, sensible cooling may be utilized to cool a gas to below its wet bulb temperature.

It should be understood that latent cooling and sensible cooling are not mutually exclusive cooling methods. Rather, these methods may be applied either exclusively or in combination. It should further be understood that the heat exchanger 30 described herein is not limited to latent cooling and sensible cooling methods, but may cool, or heat, the inlet air flow 22 through any suitable cooling or heating method as may be desired.

Figure 2:
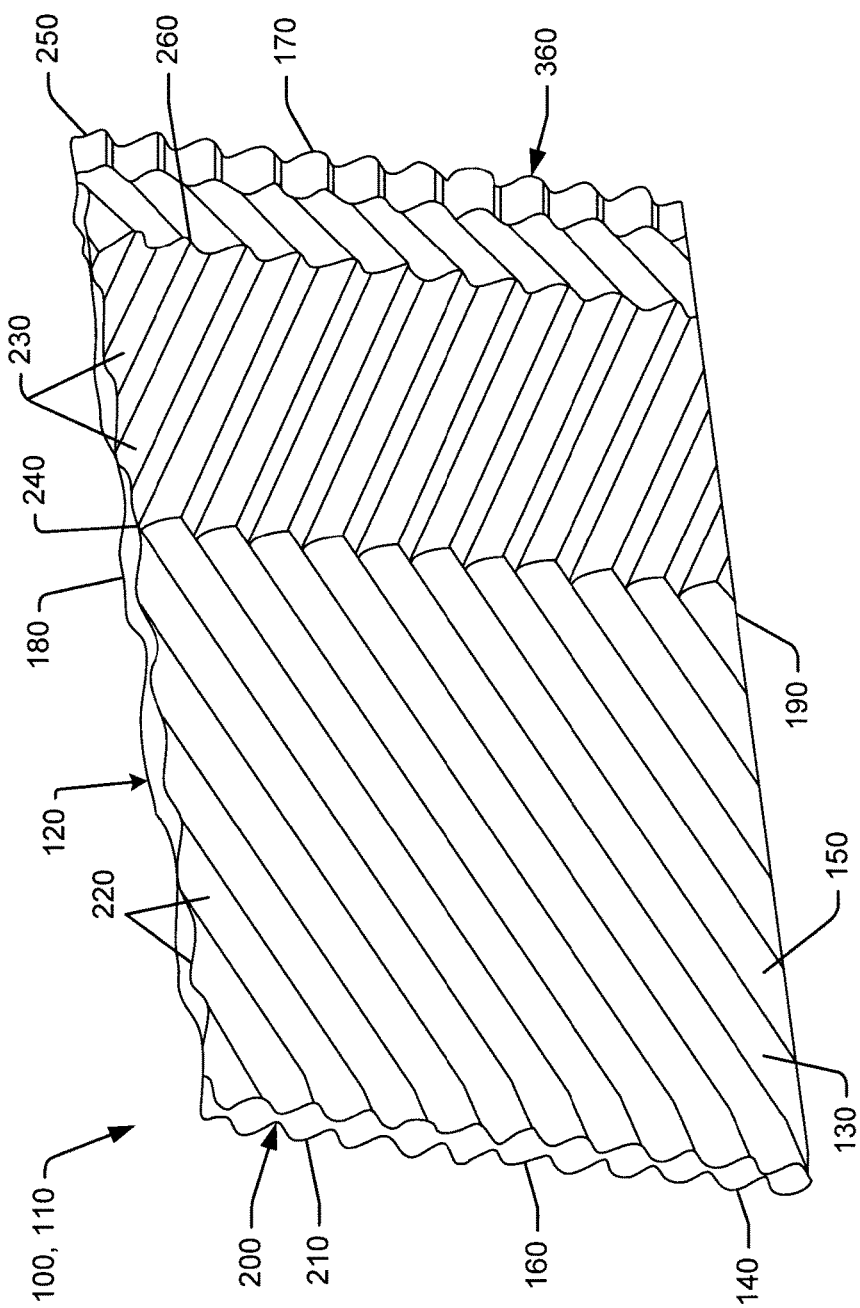
FIG. 2 is a perspective view of a first side of a media pad as may be described herein.
Figure 3:
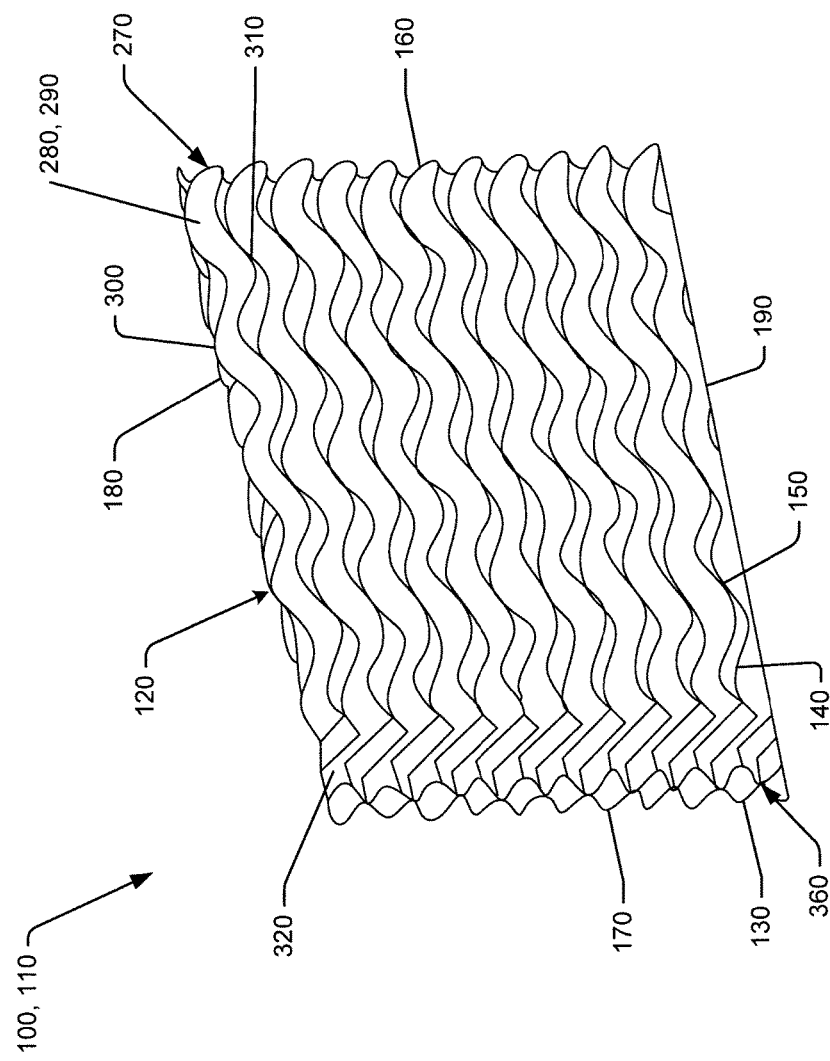
FIG. 3 is a perspective view of a second side of the media pad of FIG. 2.
Figure 4:
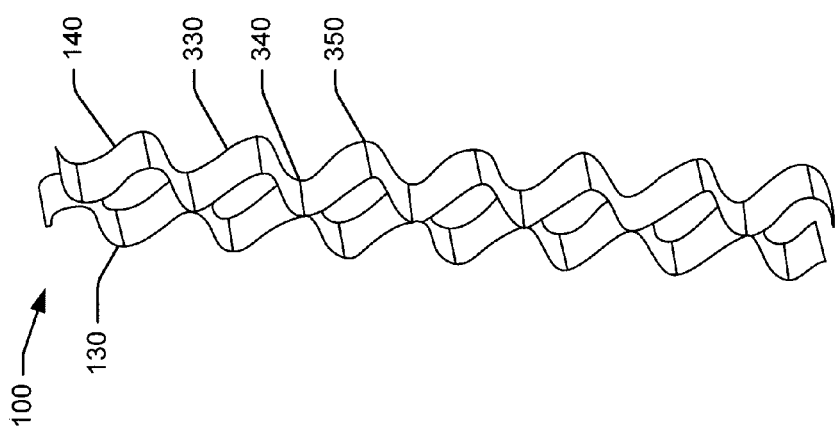
FIG. 4 is a side view of the media pad of FIG. 2.

FIGS. 2-4 show an example of a media pad 100 as may be described herein for use as an inlet heat exchanger 110 and the like. The media pad 100 may include at least a pair of media sheets 120 therein. In this example, a first media sheet 130 and a second media sheet 140 are shown although additional sheets may be used herein. Any number of the media sheets 120 may be used herein in any suitable size, shape, or configuration.

The media sheets 120 may be thermally formed from non-woven synthetic fibers with or without hydrophilic surface enhancements. For example, the non-woven synthetic fibers may include polyethylene terephthalate (PET), polytrimethylene terephthalate (PTT), nylon, polyester, polypropylene, and the like. The hydrophilic surface enhancements may include the application of a strong alkaline treatment under high processing temperatures, polyvinyl alcohol in an alkaline medium, and the like. Other materials and treatments may be used herein. The media sheets 120 may be wetable so as to accept, absorb, flow, and distribute the flow of water 32 or other type of heat exchange medium through the surface area thereof. The media sheets 120 may be utilized with different types of heat exchange mediums.

The media sheets 120 may have a substantially three dimensional contoured shape 150. Specifically, the media sheets 120 may include a leading edge 160 facing the incoming inlet air flow 22 and a downstream trailing edge 170 about the compressor 12. Likewise, the media sheets 120 may have a top edge 180 for receiving the flow of water 32 and a downstream bottom edge 190.

In this example, the first media sheet 130 may have a chevron like corrugated surface 200. The chevron like corrugated surface 200 may have a number of chevron channels 210 therein. Any number of the chevron channels 210 may be used herein in any suitable size, shape, or configuration. Specifically, the chevron channels 210 may have a diagonally rising portion 220 and a diagonally lowering portion 230. The diagonally rising portion 220 may extend from the leading edge 160 and meet the diagonally lowering portion 230 about an apex 240 thereof. The angle of the rising and the lowering portions may vary. Each of the chevron channels 210 may end in a first side mist eliminator portion 250. The first side mist eliminator portions 250 may extend diagonally upward in a sharp angle at a nadir 260 of each of the diagonally lowering portions 230. The first side mist eliminator portions 250 may extend from the nadir 260 towards the trailing edge 170. Other components and other configurations may be used herein.

The second media sheet 140 may have a wavy corrugated surface 270. Specifically, the wavy corrugated surface 270 may have a number of wavy channels 280. Any number of the wavy channels 280 may be used herein in any size, shape, or configuration. Specifically, the wavy channels 280 may have a substantially sinusoidal like shape 290 with a number of peaks 300 and valleys 310. The wavy channels 280 may extend from the leading edge 160 to a second side mist eliminator portion 320. The second side mist eliminator portions 320 may extend diagonally upward in a sharp angle from one of the valleys 310 of the sinusoidal like shape 290. The second side mist eliminator portions 320 may extend from the valley 310 towards the trailing edge 170. Other components and other configurations may be used herein.

FIG. 4 shows a first media sheet 130 bound to a second media sheet 140. The leading edge 160 thus forms a diamond like shape 330. The diamond like shape 330 may include a bonding portion 340 where the media sheets 130, 140 may meet and may be bonded via glue and the like and an expanded portion 350 for good airflow therethrough. The trailing edge 170 likewise may include the diamond like shape 330 for good air flow therethrough. The first side mist eliminator portion 250 and the second side mist eliminator portion 320 may combine to form an integrated mist eliminator 360 of a substantially uniform shape about the trailing edge 170. Other components and other configurations may be used herein.

In use, the flow of water 32 may flow from the top edge 180 to the bottom edge 190 of the media sheets 120. The media sheets 120 may be fully wetted by the flow of water 32 therethrough. The inlet air flow 22 enters via the leading edge 160 and comes in contact with the flow of water 32 for heat exchange therewith. Due to the twisting and swirling airflow generated between the media sheets 120, the flow of water 32 may evaporate into the inlet air flow 22 so as to reduce the temperature of the flow of water 32 to about the inlet air wet bulb temperature. Specifically, the twisting and swirling airflows increase heat and mass transfer therethrough.

The use of the chevron like corrugated surface 200 on the first media sheet 130 helps to distribute the flow of water 32 towards the leading edge 160. The wavy corrugated surface 270 of the second media sheet 140 provides stiffness and spreads the flow of water 32 more evenly over the media depth. The integrated mist eliminator 360 extends upward at a sharp angle to the airflow therethrough. This angle relies on inertial forces on any water droplets therein at the sharp turn. The water droplets thus may drain downward under the force of gravity and remain within the media sheets 120. This captured water helps keep the integrated mist eliminator 360 wet so as to enhance further evaporative cooling. The use of the integrated mist eliminator 360 also provides further structural strength to the overall media pad 100. Moreover, the integrated mist eliminator 360 reduces the overall axial length of the overall heat exchanger without the use of a stand-alone mist eliminator 44.

The use of the diamond like shape 330 at the leading edge 160 and the trailing edge 170 also serves to reduce air pressure losses therethrough. The media pad 100 described herein thus may increase overall air mass flow in hot weather so as to avoid or limit overall gas turbine output reduction and performance deterioration in a simplified system.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A media pad for cooling an inlet air flow to a compressor of a gas turbine engine, comprising:
   a first media sheet;
   the first media sheet comprising a chevron corrugated surface with a first mist eliminator, the chevron corrugated surface comprising a plurality of chevron channels with a diagonally rising portion and a positive Y-axis direction and a diagonally lowering portion in a negative Y-axis direction, wherein the first mist eliminator is adjacent to the diagonally lowering portion; and
   a second media sheet adjacent to the first media sheet;
   the second media sheet comprising a wavy corrugated surface with a second mist eliminator, the wavy corrugated surface comprising substantially lateral waves that are adjacent to the second mist eliminator;
   wherein the first media sheet and the second media sheet extend from a leading edge to a trailing edge, and wherein the chevron corrugated surface and the wavy corrugated surface extend from the leading edge towards the trailing edge; and
   wherein the inlet air flows in a positive X-axis direction that is perpendicular to the Y-axis.

2. The media pad of claim 1, wherein the leading edge faces the inlet air flow.

3. The media pad of claim 1, wherein the first mist eliminator and the second mist eliminator are positioned about the trailing edge.

4. The media pad of claim 1, wherein the leading edge and the trailing edge comprise a diamond like shape.

5. The media pad of claim 4, wherein a leading edge chevron angle is about 17 degrees and a trailing edge chevron angle is about 18 degrees.

6. The media pad of claim 4, wherein the diamond like shape comprises a bonding portion and an expanded portion.

7. The media pad of claim 1, wherein the first media sheet and the second media sheet extend from a top edge to a bottom edge.

8. The media pad of claim 7, wherein the top edge faces a flow of water.

9. The media pad of claim 1, wherein the first mist eliminator extends from the diagonally lowering portion at a sharp angle.

10. The media pad of claim 1, wherein the wavy corrugated surface comprises a plurality of wavy channels with peaks and valleys.

11. The media pad of claim 10, wherein the second mist eliminator extends from a valley at a sharp angle.

12. The media pad of claim 1, wherein the first mist eliminator and the second mist eliminator comprise an integral mist eliminator.

13. A method of cooling an inlet air flow for a gas turbine engine, comprising:
   positioning a media pad with a first corrugated surface having a chevron configuration, a second corrugated surface having a sinusoidal wavy configuration, and an integral mist eliminator about an inlet of the gas turbine engine, wherein the first corrugated surface and the second corrugated surface extend from a leading edge to a trailing edge, and wherein the chevron corrugated surface and the wavy corrugated surface extend from the leading edge towards the trailing edge;
   flowing water from a top to a bottom of the media pad through the first corrugated surface and the second corrugated surface;
   exchanging heat between the inlet air flow and the flow of water;
   capturing any mist from the flow of water in the integral mist eliminator; and
   flowing the captured mist back to the first corrugated surface and the second corrugated surface.

14. A media pad for cooling an inlet air flow to a compressor of a gas turbine engine, comprising:
   a first media sheet;

the first media sheet comprising a plurality of chevron channels leading to a first mist eliminator, the plurality of chevron channels comprising a diagonally rising portion in a positive Y-axis direction and a diagonally lowering portion in a negative Y-axis direction, wherein the first mist eliminator is adjacent to the diagonally lowering portion; and a second media sheet;

the second media sheet comprising a plurality of substantially horizontal wavy channels leading to a second mist eliminator;

wherein the first mist eliminator and the second mist eliminator form an integral mist eliminator; and wherein the first media sheet and the second media sheet extend from a leading edge facing an inlet air flow to a trailing edge with the integral mist eliminator, and wherein the plurality of chevron channels and the plurality of wavy channels extend from the leading edge towards the trailing edge; and wherein the inlet air flows in a positive X-axis direction that is perpendicular to the Y-axis.

15. The media pad of claim 14, wherein the leading edge and the trailing edge comprise a diamond like shape.

16. The media pad of claim 14, wherein the plurality of wavy channels comprises peaks and valleys.

* * * * *